Feb. 20, 1940.  W. ERNST  2,190,939
HYDRAULIC SYSTEM AND CONTROL
Filed Aug. 5, 1935   9 Sheets-Sheet 1

INVENTOR
WALTER ERNST.
BY
Toulmin & Toulmin
ATTORNEYS

Feb. 20, 1940.   W. ERNST   2,190,939
HYDRAULIC SYSTEM AND CONTROL
Filed Aug. 5, 1935   9 Sheets-Sheet 3

INVENTOR
WALTER ERNST.
BY Toulmin & Toulmin
ATTORNEYS

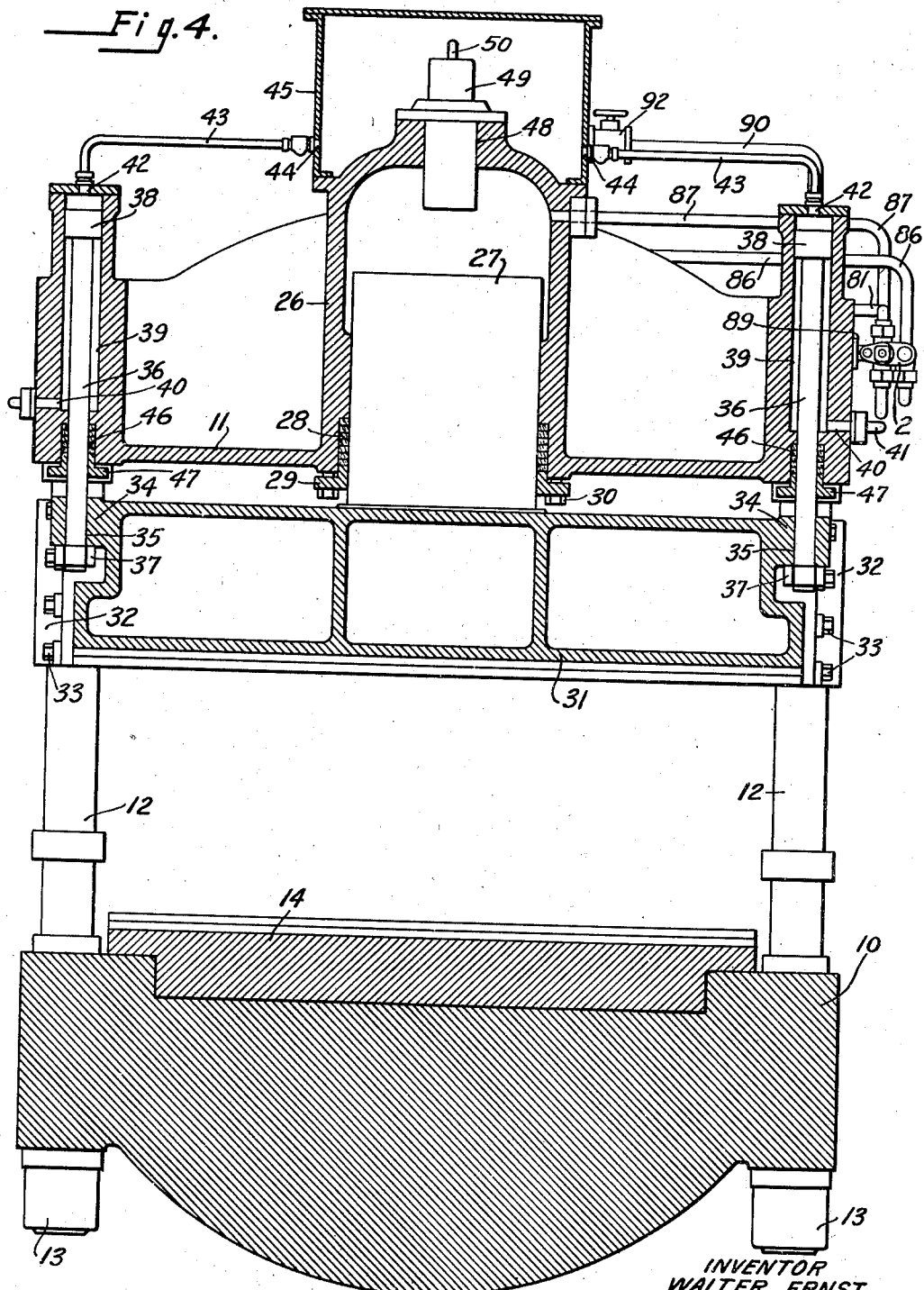

Feb. 20, 1940. W. ERNST 2,190,939
HYDRAULIC SYSTEM AND CONTROL
Filed Aug. 5, 1935 9 Sheets-Sheet 5
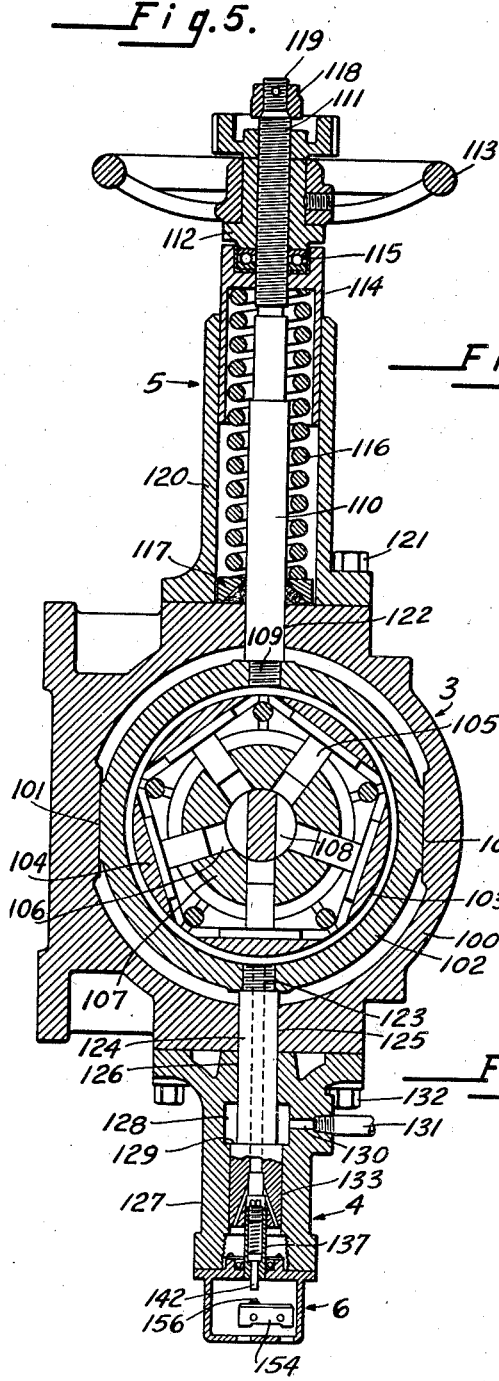
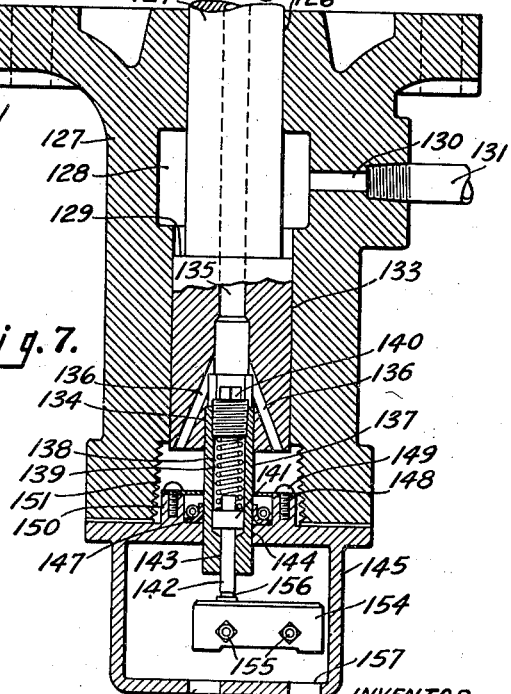
INVENTOR
WALTER ERNST.
BY Toulmin & Toulmin
ATTORNEYS Feb. 20, 1940.                    W. ERNST                    2,190,939
                          HYDRAULIC SYSTEM AND CONTROL
                              Filed Aug. 5, 1935              9 Sheets-Sheet 6
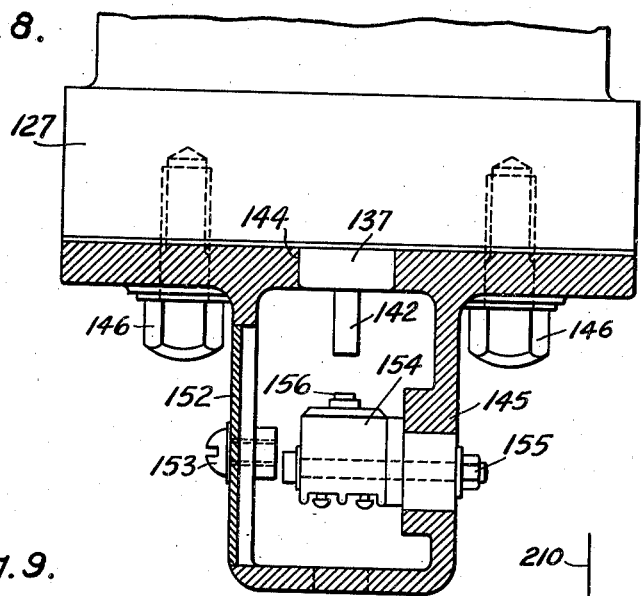
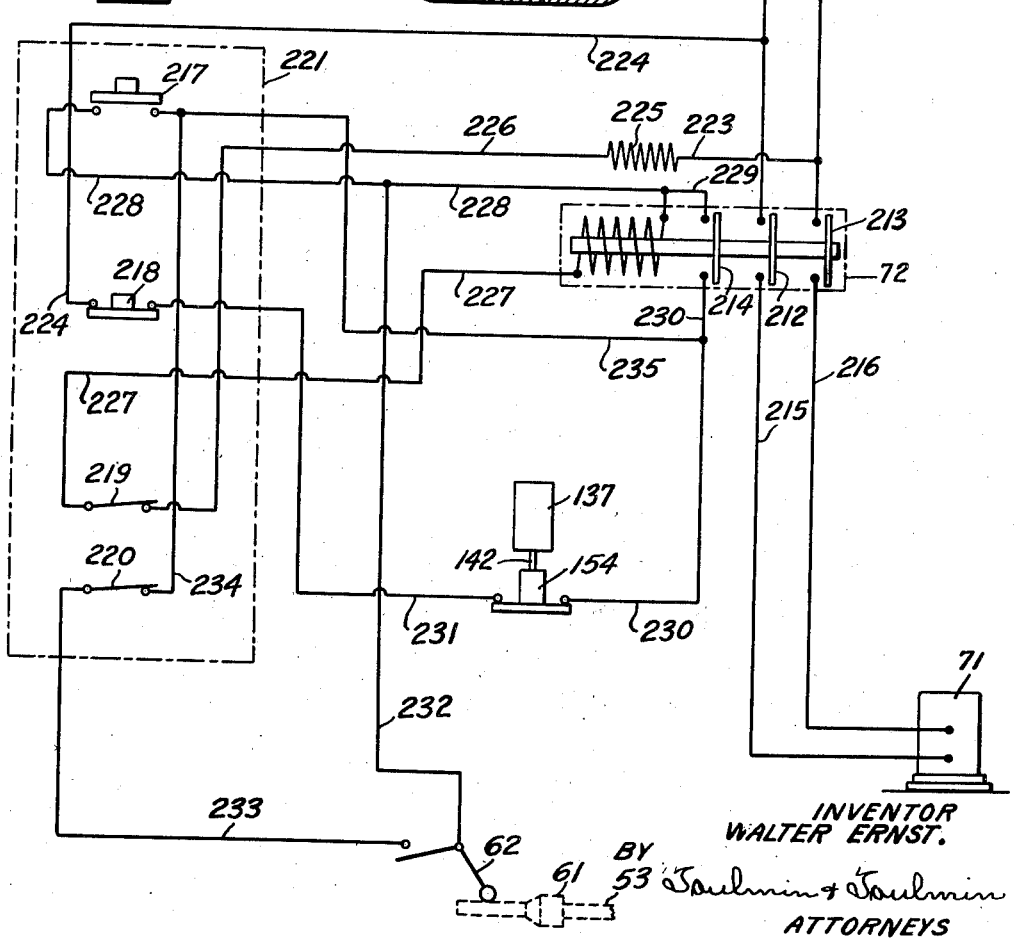
INVENTOR
WALTER ERNST.
BY Toulmin & Toulmin
ATTORNEYS Feb. 20, 1940. W. ERNST 2,190,939
HYDRAULIC SYSTEM AND CONTROL
Filed Aug. 5, 1935 9 Sheets-Sheet 7

INVENTOR
WALTER ERNST.
BY
Toulmin & Toulmin
ATTORNEYS

Feb. 20, 1940.   W. ERNST   2,190,939
HYDRAULIC SYSTEM AND CONTROL
Filed Aug. 5, 1935   9 Sheets-Sheet 8

INVENTOR
WALTER ERNST.
BY
Toulmin & Toulmin
ATTORNEYS

Feb. 20, 1940.                    W. ERNST                    2,190,939
                         HYDRAULIC SYSTEM AND CONTROL
                           Filed Aug. 5, 1935            9 Sheets-Sheet 9
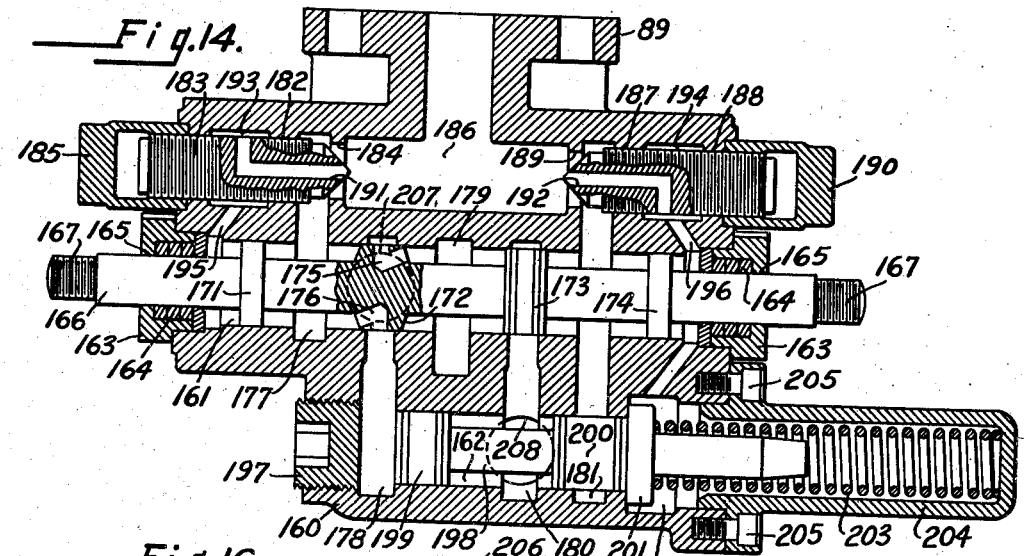
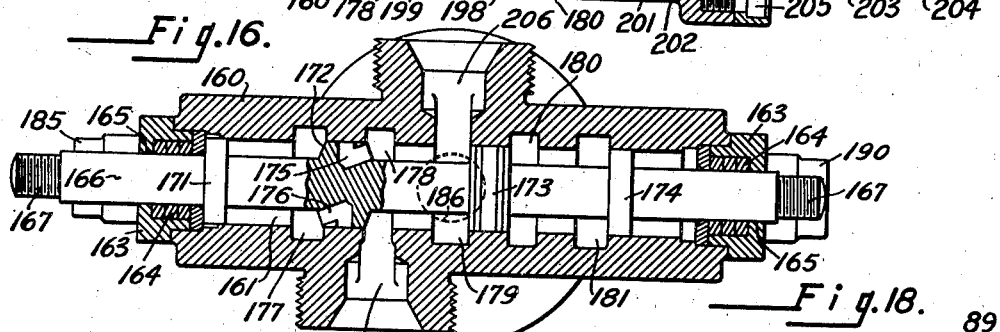
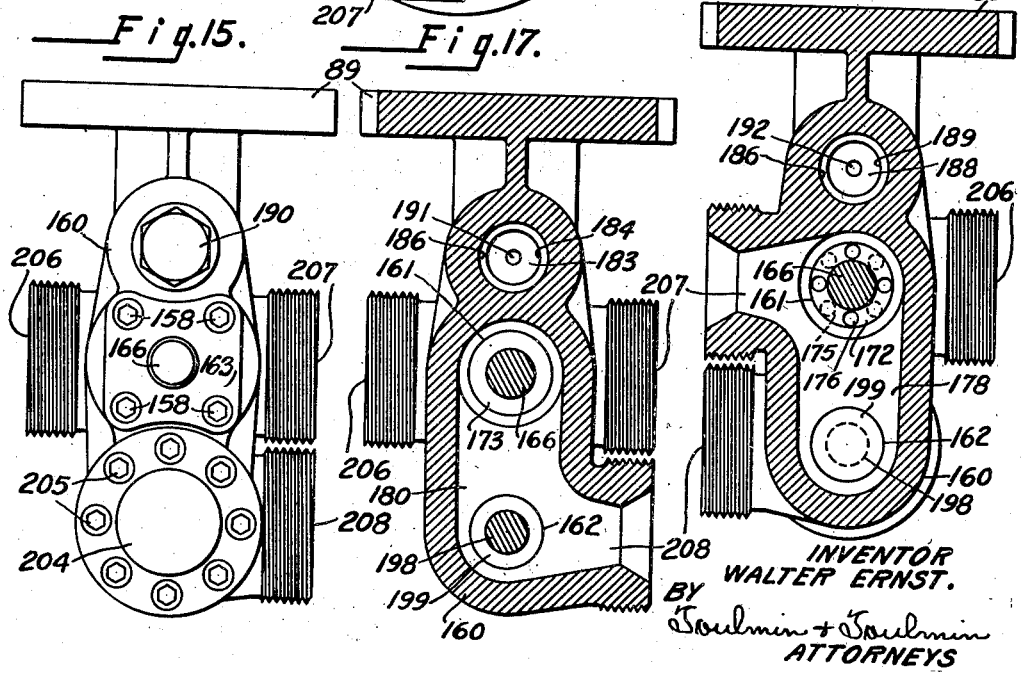
INVENTOR
WALTER ERNST.
BY
Toulmin & Toulmin
ATTORNEYS Patented Feb. 20, 1940

2,190,939

UNITED STATES PATENT OFFICE 2,190,939

HYDRAULIC SYSTEM AND CONTROL

Walter Ernst, Mount Gilead, Ohio, assignor, by mesne assignments, to The Hydraulic Press Corporation, Inc., Wilmington, Del., a corporation of Delaware Application August 5, 1935, Serial No. 34,652

15 Claims. (Cl. 60—52)

This invention relates to hydraulic machinery, and in particular, to circuits and devices for controlling presses and similar hydraulic machinery.

One object of this invention is to provide a hydraulic circuit containing a press, with means for by-passing the delivery of the pump after the working stroke has been completed, until the pressure has been released from the main cylinder during the delivery into the pull-back cylinders.

Another object is to provide such a circuit containing means for obtaining release pressure from the main cylinder before the start of the pull-back stroke.

Another object is to provide a circuit having automatic devices for diverting the application of the pump pressure to the pull-back cylinders until the pressure has been sufficiently released from the main cylinder, after which the pump is automatically applied to discharge its pressure into the pull-back cylinders, thus giving a smooth release of pressure from the main cylinder and a smooth pick-up on the pull-back stroke.

Another object is to provide an electro-hydraulic circuit for electrically regulating the condition of the hydraulic circuit and permitting the press to be operated manually, semi-automatically or completely automatically.

Another object is to provide such an electro-hydraulic circuit wherein the electrical circuit is controlled by means associated with the pump control mechanism.

Another object is to provide an electrical circuit arranged to energize an electrical device, which in turn, shifts a valve to vary its positions so as to control the operation of the press, this valve having means associated therewith for by-passing the delivery of the pump between the instant of release of pressure from the main cylinder and the time when such release is complete, before pressure is applied to the pull-back cylinders for the return stroke.

Another object is to provide a pump control system having an electrical circuit regulator associated with the pump control so that the latter operates the former when the attainment of a predetermined pressure causes the pump control to shift.

Another object is to provide a four-way valve for controlling a press, and having a by-pass arrangement for automatically by-passing the delivery of the pump until the pressure has been sufficiently released from the main cylinder, whereupon the pump delivery is automatically applied to the pull-back cylinders to accomplish the return stroke of the press.

In the drawings:

Figure 4 is a central, vertical section through the press, taken along the line 4—4 of Figure 2.

Figure 5 is a central, vertical section through a pump, showing the electrical circuit regulating device associated with the pump control.

Figure 6 is an enlarged detail view of the electrical circuit regulating device shown in Figure 5, with the parts in a position disengaged from the switch.

Figure 7 is a view similar to Figure 6, but with the parts in a position engaging the switch.

Figure 8 is a view, partly in section, taken along the line 8—8 of Figure 6.

Figure 9 is a wiring diagram of the electrical control system.

Figure 14 is a view similar to Figure 10, but with the valve in its fifth position, i. e., while the press is idle at the top of its return stroke.

Figure 15 is an end elevation of the valve shown in Figures 10 to 14.

Figure 16 is a vertical section along the line 16—16 of Figure 10.

Figure 17 is a vertical section along the line 17—17 of Figure 10.

Figure 18 is a vertical section along the line 18—18 of Figure 13.

General Arrangement

Figure 1:
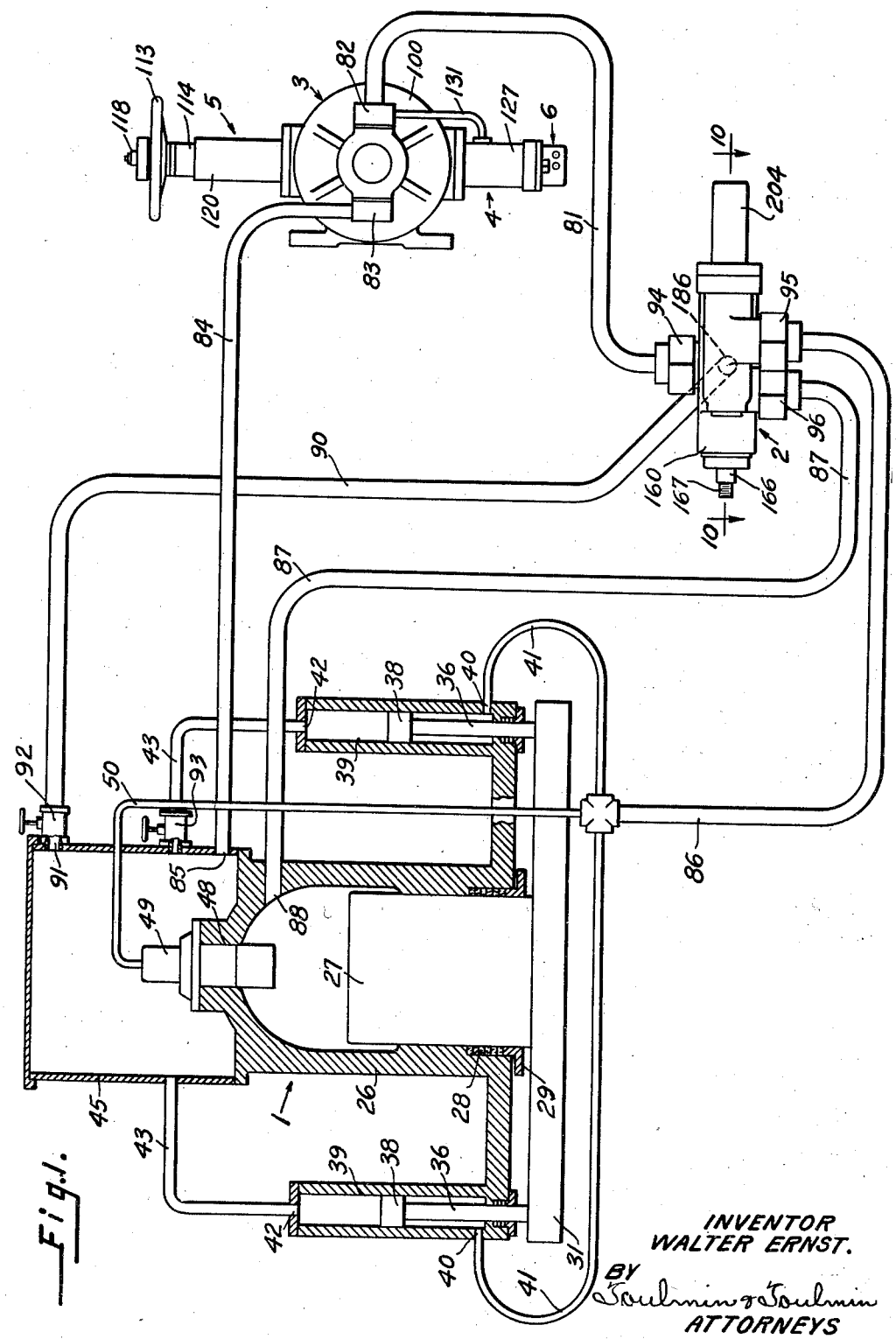
Figure 1 is a diagrammatic view, partly in section, of the hydraulic circuit of this invention, with the principal elements thereof shown in diagrammatic form.

In general, the present invention is concerned with a control system for operating a press, in which a pump is employed in connection with a multi-position valve, the valve itself being so shifted to apply the pressure fluid from the pump selectively to the main cylinder for a pressing stroke, to the pull-back cylinders for a return stroke, to by-pass the pump discharge while releasing the pressure from the main cylinder between the forward and return strokes, and to by-pass the pump discharge and cause the press to be held at the top of its return stroke.

Hitherto, when four-way valves have been employed with a pump discharging in one direction, it has been found difficult to control the release of the pressure from the large main cylinder during the operation of the valve. If the valve was opened quickly a recoil resulted, due to the sudden release of pressure from the main cylinder. On the other hand, if it was attempted to release the pressure slowly or release it through a restricted opening, then a time interval occurred during which there was no place for the discharge of the pump to go. The pump discharge was to be directed into the pull-back cylinders, but could not return the press until after the pressure had dropped from the main cylinder. If this pressure drop occupied too long a time, a shock was set up in the pump and discharged into the pull-back cylinders without causing the platen to move.

The present invention includes a valve having an additional valve stem which is automatically held open by the pressure in the main cylinder as long as there is any pressure in this main cylinder, this additional valve stem providing a by-pass for the pump until all pressure has been released from the main cylinder. In this manner there is provided a controlled release of pressure from the main cylinder at any desired speed, and yet the pump discharge is automatically by-passed while the release of pressure in the main cylinder takes place. After this main cylinder pressure is fully released, the by-pass automatically closes and permits the pump discharge to flow into the pull-back cylinders and return the press. In this way there is provided a smooth release of pressure, and a smooth pick-up on the pull-back stroke.

The valve in the present invention is actuated by electrical means controlled by a switch assoated with the pump control mechanism, thereby eliminating the necessity for separate pressure switches, or similar devices. The electrical circuit containing these devices is arranged so that the press may be operated in three different ways: Completely automatic operation, wherein the press automatically performs an indeterminate number of pressing and return strokes without halting at the end of the return stroke; semi-automatic operation, wherein the press is caused to execute a pressing and return stroke, and then halt at the end of the return stroke; and manual operation, wherein the operation of the press is controlled manually so that the operator controls the point at which the press platen will stop at the end of the pressing stroke and/or the return stroke.

Figure 3:
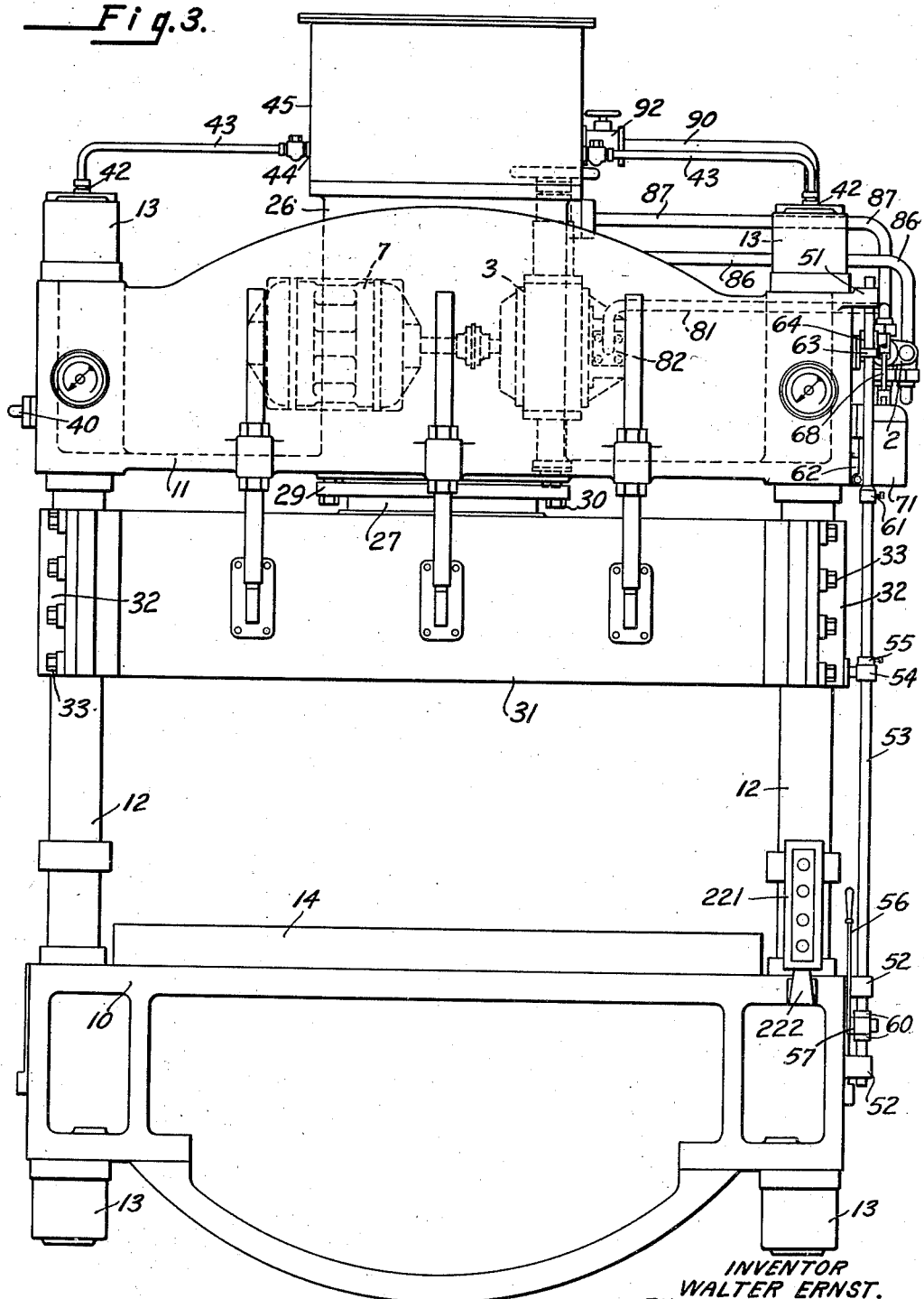
Figure 3 is a front elevation of the press shown in Figure 2.

Figure 1 shows a diagrammatic layout of the principal elements involved in the system of this invention. In Figure 1 is shown a press, generally designated 1, connected to a control valve, generally designated 2, which receives the discharge of a pump, generally designated 3. The pump 3 is provided with a pressure-responsive control device, generally designated 4, which returns the flow-control element of the pump to a neutral position upon the attainment of a predetermined pressure, the amount of which may be regulated by the adjusting mechanism, generally designated 5. An electrical circuit-breaking device, generally designated 6, is associated with the pressure-responsive device 4 and actuated thereby to control the energization of the electrical devices employed for shifting the control valve 2 to its various positions. As hereinafter explained, the control valve 2 may also be shifted mechanically by devices associated with the press. The pump 3 is driven by the electric motor 7 (Figure 3).

Press construction and associated mechanism

The press 1, shown in the drawings, has incorporated therein the various devices of this invention, and consists of a base 10 and a top member 11 interconnected by strain rods 12, and clamped thereto by the nuts 13. The base 10 has associated therewith a work table 14.

The main cylinder 26 contains a main plunger 27, passing through a packing 28 compressed by a gland 29 through the cap screws 30, thereby preventing leakage from the main cylinder 26 around the main plunger 27. To the lower end of the main plunger 27 is attached the platen 31, which is reciprocably mounted upon the strain rods 12, and which is held in engagement therewith by the end plates 32 secured to the platen by the cap screws 33.

The platen 31 in its central plane and at its outer extremities contains projecting portions forming arms 34, which have bores 35 arranged to receive the ends of pull-back piston rods 36 (Figure 4), these being secured thereto by the nuts 37 threaded on the lower ends thereof. The piston rods 36 have pull-back pistons 38 mounted on the upper ends thereof, and arranged to reciprocate within the pull-back cylinders 39 mounted on either side of the main cylinder 26. The ports 40 beneath the pull-back pistons 38 open into the pipe line 41, which serves to convey fluid thereto from the control valve 2, in a manner described below. Similarly, the upper ends of the pull-back cylinders 39 contain ports 42, from which pipe lines 43 run to the ports 44 of the surge tank 45 to drain off leakage from pistons. Escape of fluid from the pull-back cylinders 39 is prevented by the packings 46 compressed by the glands 47 around the piston rods 36.

The head of the main cylinder 26 (Figure 4) is provided with a bore 48, arranged to receive a surge valve 49, to which is attached the actuating pipe 50 running therefrom to a connection with the pull-back cylinder pipe line 41 (Figure 1). The surge valve 49 serves to permit the prefilling of the main cylinder 26, while the main plunger 27 is moving downward under gravity at the beginning of the forward stroke; and also serves to release fluid from the main cylinder 26 during the return stroke of the platen. The fluid for this purpose is taken in from and returned to the surge tank 45. The details of the surge valve 49 form no part of the present invention, and a complete disclosure thereof will be found in United States patent to Ernst, No. 1,892,568, issued December 27, 1932.

Figure 2:
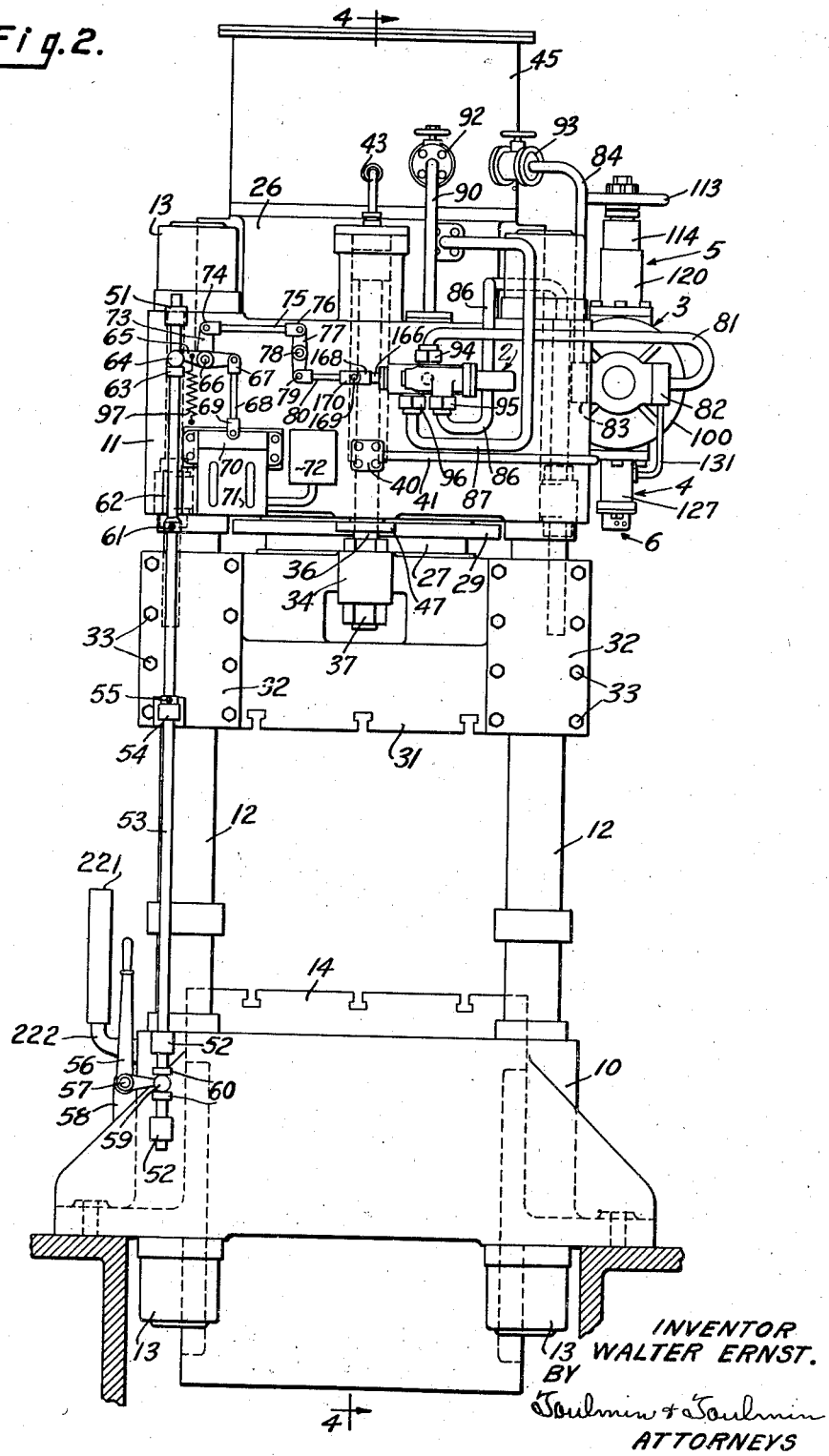
Figure 2 is a side elevation of the press and associated control mechanism according to the present invention.

Movably mounted in lugs 51 and 52 in the upper and lower press members 11 and 10, respectively, is a press control rod 53 (Figures 2 and 3). An arm 54 extends outwardly from the platen 31 and encircles the control rod 53 in such a manner as to engage an adjustable stop 55 thereon to lift the control rod 53 upon its upward or return stroke. The control rod may also be shifted by means of a hand lever 56 of bellcrank form, and pivoted, as at 57, upon the frame boss 58. The outer end of the bellcrank portion of the hand lever 56 is yoke shaped, and provided with a pair of rounded portions 59, making contact with collars 60 mounted upon the control rod 53 (Figure 2).

Also mounted on the control rod 53 on the upper portion thereof is an adjustable collar 61, arranged to engage the lever of a limit switch 62, the instant of actuation being varied by moving the collar 61 up or down the control rod 53. Still further up the control rod 53 is a collar 63 (Figure 2), arranged to engage the rounded ends 64 on the yoke-shaped end of a lever 65, which is pivotally mounted on the shaft 66. The latter is mounted upon the upper member 11 of the press. Pivotally connected to the opposite end of the lever 65 from the ends 64 is a clevis 67, having secured thereto a link 68 leading to a clevis 69 pivotally mounted upon the armature 70 of a solenoid 71. Adjacent the solenoid 71 and controlling the solenoid is a magnetic switch 72, the operation of which is described below.

Operatively connected to the lever 65 and mounted to move upon the same shaft 66, is an arm 73. On the outer end of the arm 73 is pivotally mounted a clevis 74, to which is attached a connecting rod 75 leading to a clevis 76, pivotally mounted upon the end of a lever 77. The latter is pivotally supported on the shaft 78, near its midpoint, and on its lower end is provided with a clevis 79 pivotally mounted thereon and connected to the operating rod 80 of the control valve 2. The details of the control valve 2 are described below. Consequently, it will be seen that when the solenoid 71 is energized the armature 70 will be drawn downward, the operating rod 80 moved to the left. When the solenoid 71 is deenergized, however, the spring 97 will force this linkage in the opposite direction, moving the solenoid armature 70 upward, and the valve operating rod 80 to the right.

Leading to a single connection 94 on the upper side of the control valve 2 is the pressure line 81, whose other end terminates at the pressure coupling 82 of the pump 3. The suction coupling 83 thereof is joined to the surge tank 45 by the pipe line 84, giving access thereto through the port 85 (Figures 1 and 2). Leading from the connection 95 on the lower side of the control valve 2, to the pull-back line 41, is the pipe line 86. The pipe line 87 similarly leads from another bottom connection 96 of the control valve 2 to the port 88 in the main cylinder 26 (Figures 1, 2 and 4). A connection 89 (Figure 4) serves to support the control valve 2 upon the upper member 11 of the press, and also to provide an exhaust duct leading through the pipe line 90 to the surge tank 45 by way of the port 91 therein. Valves 92 and 93 control the discharge of fluid from the lines 90 and 84, respectively, into the surge tank 45 (Figure 2). Mounted on the rear side of the upper press member 11 is the pump 3, driven by the motor 7 (Figure 3).

*Pump control mechanism*

The pump 3 is of the variable delivery type, and consists of a casing 100 (Figure 5), having bearing pads 101 arranged to reciprocably support a shift ring 102, which rotatably supports a secondary rotor 103. On the secondary rotor are guide blocks 104, arranged to reciprocably receive the cross heads of pistons 105. The pistons 105 reciprocate in cylinder bores 106 within a primary rotor or cylinder barrel 107. The latter is rotatably mounted upon a hollow pintle 108, provided with valve passages serving to transmit fluid to and from the cylinder bores 106, in a manner well known to those skilled in the art. Consequently, when the shift ring 102 is moved, the secondary rotor 103 will be caused to rotate around an axis which is eccentric to the axis of the primary rotor 107 upon the pintle 108. This eccentricity will cause the piston 105 to reciprocate radially in the cylinder barrel or primary rotor 107, while their cross heads reciprocate tangentially in the guide blocks 104.

Secured to one side of the shift ring 102 by the threaded connection 109 is a rod 110, having a screw threaded portion 111 at its outer end. Threaded upon this portion 111 is the hub 112 of a hand wheel 113, which engages a slidable sleeve 114 through the intermediate agency of a ball thrust bearing 115. Surrounding the rod 110, with one end engaging the inner end of the sleeve 114, is a coil spring 116, the opposite end of which engages a collar 117, surrounding the rod 110 and abutting the casing 100 of the pump. A nut 118 on the threaded outer end 119 of the rod 110 prevents dislodgment of the hand wheel 113. The sleeve 114 is reciprocable within the casing 120 of the adjusting device 5, this casing being secured to the pump casing 100 by the bolts 121. The rod 110 passes through a bore 122 in the casing 100. Consequently, by rotating the hand wheel 113 the spring 116 may be compressed to impart any desired amount of force to the rod 110.

Secured to the opposite side of the shift ring 102, as by the threaded connection 123, is a rod 124 which passes through the bore 125 in the pump casing 100, and also through the bore 126 in the casing 127 of the pump control device 4. Within the casing 127 is a chamber 128, and within this chamber the rod 124 is enlarged to provide an annular piston head 129. The port 130 provides access to the chamber 128 and is joined to the pipe 131 leading to the pressure coupling 82 of the pump 3 (Figures 1 and 5). The casing 127 is secured to the pump casing 100 by means of the bolts 132.

The enlarged portion of the rod 124 is arranged to reciprocate within an enlarged bore 133, coaxial with the bore 126 on the opposite side of the chamber 128 (Figure 6). The end of the enlarged portion of the rod 124 terminates in a counterbore 134, which continues from a bore 135 passing entirely through the rod 124 from the interior of the pump casing 100 at its threaded connection 123. Diagonal passageways 136 lead from the outer end of the rod 124 into the bore 135 so as to provide free passage of oil therethrough. Mounted in the counterbore is a hollow plug 137 containing a bore 138, arranged to receive a coil spring 139. One end of the coil spring engages the plug 140, threaded into the upper end of the bore 138 (Figure 6), whereas the opposite end engages the enlarged portion 141 of a switch operating rod 142 which passes through a bore 143 in the end of the hollow plug 137. The outer end of the hollow plug 137 passes through a bore 144 in the end wall of a switch casing 145, the latter being secured to the control casing 127 by the bolts 146 (Figure 8).

Surrounding the hollow plug 137 is an annular oil seal 147, held in position by an annular plate 148, secured by the screws 149 to an annular projection 150 upon the end wall of the switch casing 145. The threaded aperture 151 in the end of the control casing 127 is provided for purposes not connected with the present invention. The switch casing 145 contains a cover plate 152, held in engagement therewith by the bolt 153. The cover plate 152 gives access to a normally closed single-throw switch 154 secured to the switch casing 145 by the bolts 155. The contact button 156 of the switch 154 is arranged in line with the switch operating rod 142 on the end of the plug 137 in the rod 124 (Figures 6 and 8). Ports 157 provide drainage of any oil which may escape past the oil seal 147.

When it is desired to cause the pump to deliver fluid the hand wheel 113 is turned so as to move the shift ring 102 to a position which is eccentric of the pintle 108 and primary rotor 107, compressing the spring 116. As the pump operates it builds up pressure, this pressure being communicated through the line 131 from the pressure coupling 82 to the chamber 128. This pressure acts against the annular piston head 129, and when it increases to a sufficiently large amount it overcomes the resistance of the coil spring 116 and moves the pump shift ring 102 downward toward its neutral position (Figure 5). In this manner the pump is caused to regulate itself and to cut down its own discharge when its delivery approaches a predetermined pressure. When the shifting of the shift ring 102 thus takes place, through the action of the annular piston head 129, the same action causes the switch operating rod 142 to move from its disengaged position (Figure 6) to its engaged position (Figure 7), operating the switch 154 and opening its normally closed contacts. This brings about a control of the solenoid 71 through the magnetic switch 72, in the manner described below.

*Control valve construction and operation*

Figure 10:
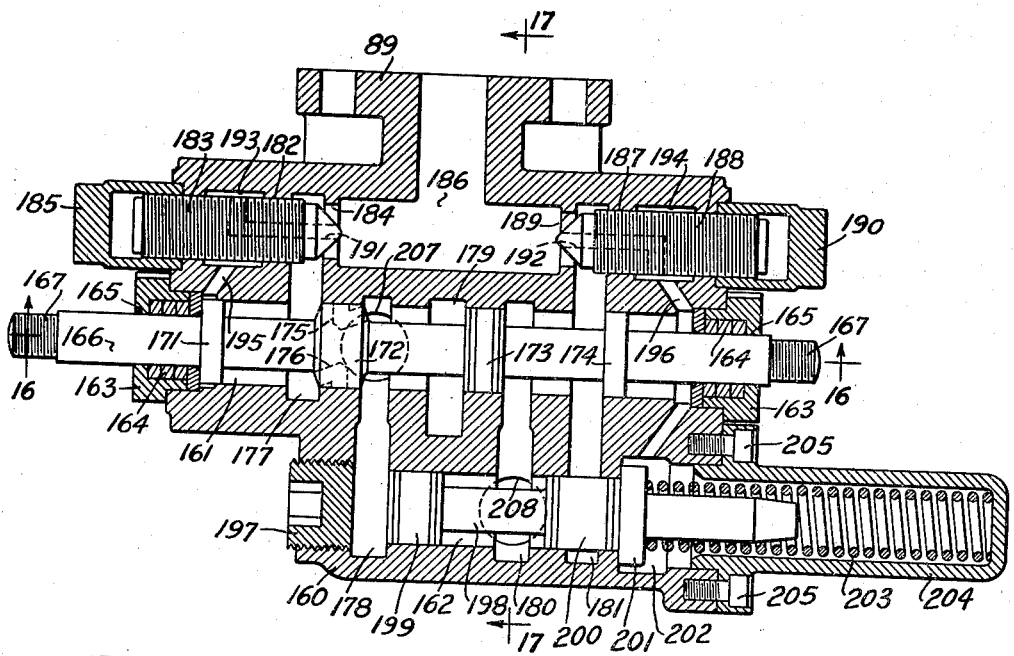
Figure 10 is a horizontal section through the control valve of this invention, taken along the line 10—10 of Figure 1, and showing the valve in its first position, for causing a forward movement of the press.

The control valve 2 consists of a casing 160 (Figures 10 to 18), provided with a pair of substantially parallel bores 161 and 162 (Figure 10). The opposite ends of the bore 161 are closed by the annular plugs 163, having the packings 164 for preventing the escape of fluid. The screws 158 serve to secure the plugs 163 to the casing 160 (Figure 15). Passing through the apertures 165 in the annular plugs 163 is a valve rod 166, having threaded ends 167. Mounted on one of these threaded ends 167 is a clevis 168, which pivotally engages, as at 169, a clevis 170 mounted on the end of the valve operating rod 80 (Figures 2 and 10).

The valve rod 166 is provided with a plurality of heads 171, 172, 173 and 174. The heads 171 and 174 serve to limit the reciprocation of the valve rod 166 by engaging the annular plugs 163 at the opposite limit of reciprocation. The valve head 172 is provided with oppositely drilled passages 175 and 176, which serve for the passage of fluid in the mid-position of the valve shown in Figure 14, at which time the valve is in the position for causing the platen to remain idle at the top of its stroke.

The valve bore 161 is provided with a plurality of enlarged ducts 177, 178, 179, 180 and 181. The duct 177 leads from the bore 161 to the choke bore 182, the latter receiving the choke screw 183, threaded therein and arranged to partially close the aperture 184 in the end thereof. The end cap 185 covers the end of the choke screw 183 and prevents it from being accidentally rotated. The aperture 184 opens into the exhaust duct 186, passing through the connection 89 by which the valve is supported upon the press head 11.

The duct 181 also establishes communication between the valve bore 161 and the choke bore 187. The latter is of similar construction to the choke bore 182 and receives a choke screw 188, threaded therein and having a tapered end, partially closing the aperture 189, likewise leading into the exhaust duct 186. The choke screw 188 is similarly covered by an end cap 190 for a similar purpose to the end cap 185. The choke screws 183 and 188 are provided with drilled passages 191 and 192, respectively, these providing drainage into the exhaust duct 186 from the annular chambers 193 and 194 surrounding the choke screws 183 and 188, and communicating by the drilled passages 195 and 196 with the opposite ends of the valve bore 161. The outer end of the duct 181 communicates with the valve bore 162. The ducts 178 and 180 also establish intercommunication between the valve bores 161 and 162. The outer end of the valve bore 162 is closed by a threaded plug 197, giving access to the interior thereof.

Reciprocably mounted in the valve bore 162 is a valve rod 198, having spaced heads 199 and 200 thereon. An enlargement 201 in the chamber 202 serves to limit the motion of the valve rod 198, and is urged to the left by the coil spring 203, whose opposite end rests against the inner wall of the spring cap 204. The latter is secured to the casing 160 by means of the screws 205. Fluid is permitted to enter the duct 179 in the valve bore 161 through the port 206 (Figure 16). The latter communicates with the upper connection 94, leading to the pressure pipe line 81 from the pump 3. The port 207 leads from the duct 178 to the lower left-hand connection 96, whence the pipe line 87 leads to the main cylinder 26. A third port 208 leads from the duct 180, within the valve bore 162, to the outer connection 95, from which the pipe line 86 runs to the pipe line 41 of the pull-back cylinders 39 (Figures 1 and 10).

In the operation of the control valve 2 the valve rods 166 and 198 may occupy any one of the five different positions shown in Figures 10 to 14, inclusive. The first position of the control valve 2 provides for the forward movement of the press, and is shown in Figure 10. In this position the fluid from the pressure coupling 82 of the pump 3 passes along the pressure line 81, through the connection 94 and port 206, into the duct 179, thence through the passageway provided between the valve heads 173 and 172, into the duct 178, thence through the port 207 and the connection 96, to and through the line 87 leading to the main cylinder 26 (Figures 1 and 10).

At the same time the oil from the pull-back cylinders 39 proceeds through the pipe lines 41 and 86 to the connection 95, thence through the port 208 into the duct 180, thence through the passageway between the valve heads 173 and 174 into the duct 181, thence through the choked aperture 189, into the exhaust duct 186, thence through the pipe line 90 into the surge tank 45, through the port 91 thereof (Figures 1 and 10). The choke screw 188 permits the rapid traverse speed of the platen to be adjusted by varying the size of the annular passage through the aperture 189 into the exhaust duct 186.

Figure 11:
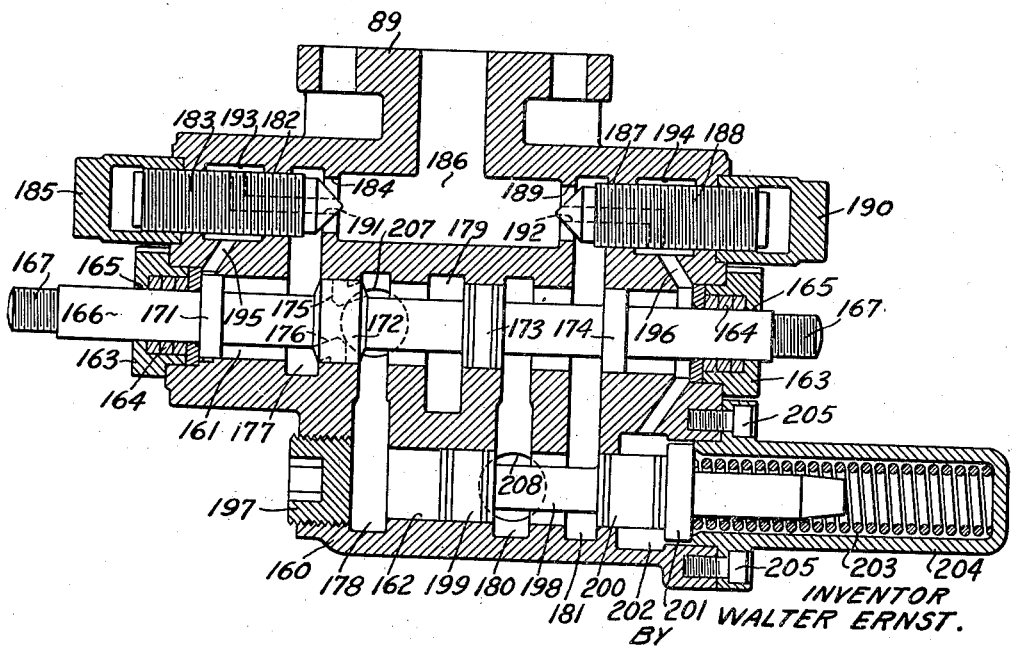
Figure 11 is a view similar to Figure 10, but with the valve in its second position, i. e., during the pressing operation.

As soon as the press platen encounters the resistance of the work-piece, the pressure built up in the system will force the lower valve head 199 to the right into the position shown in Figure 11. This position is maintained during the pressing operation, and the fluid coming from the pullback cylinders 39, through the port 208, is additionally permitted to pass outward through the duct 181, as well as through the duct 180.

Figure 12:
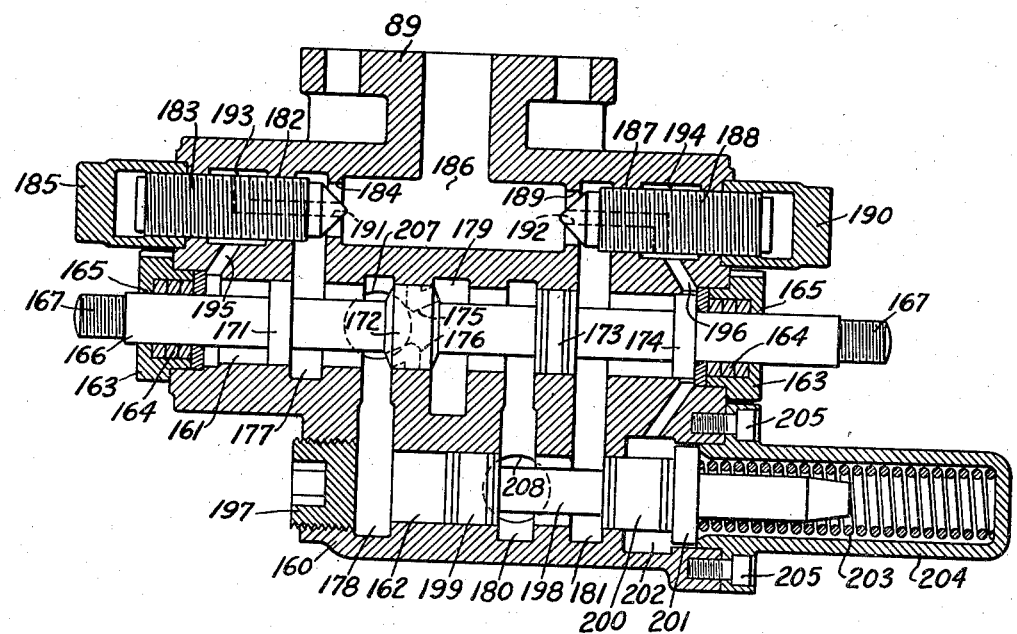
Figure 12 is a view similar to Figure 10, but with the valve in its third position, i. e., during the interval between the forward and return strokes of the press, and while the pump discharge is being by-passed during the release of pressure from the main cylinder.

When the desired pressure has been exerted upon the work-piece, the valve rod 166 is moved to the right into the position shown in Figure 12, either manually, by means of the hand lever 56 or by the solenoid 71, as energized by the opening of the normally closed switch 154 associated with the pump 3. In this position the pump discharge proceeds through the port 206 and into the duct 179, and thence through the annular passageway between the heads 172 and 173 into the duct 180, thence through the annular passageway between the heads 199 and 200 on the valve rod 198, into the duct 181, and thence outward through the choked aperture 189 into the exhaust duct 186, returning to the surge tank 45 by the line 90.

In this manner the discharge of the pump is diverted to the surge tank 45, and thus by-passed while the pressure is discharging from the main cylinder 26. The fluid from the main cylinder 26 proceeds through the port 88 and the line 87, through the connection 96 and the port 207 into the duct 178, and thence through the annular passageway between the heads 172 and 171 into the duct 177, thence outward past the choked aperture 184 into the exhaust duct 186, and thence to the surge tank 45 by way of the line 90.

Thus the choke screw 183 may be adjusted so that a gradual and slow release of the pressure fluid from the main cylinder can take place, without any shock because the pump discharge is by-passed while this release is taking place. This provision gives a place for the flow of the pump to be diverted while the gradual release of the pressure in the main cylinder takes place, for otherwise pressure from the pump could not lift the platen 31 by means of the pull-back pistons 38 so long as there was pressure in the main cylinder 26. The piston valve arrangement on the valve rod 198, therefore, permits the pump to by-pass freely while the slow release of the pressure fluid in the main cylinder takes place, thereby avoiding the shock and "water hammer" occasioned by sudden releases of pressure.

Figure 13:
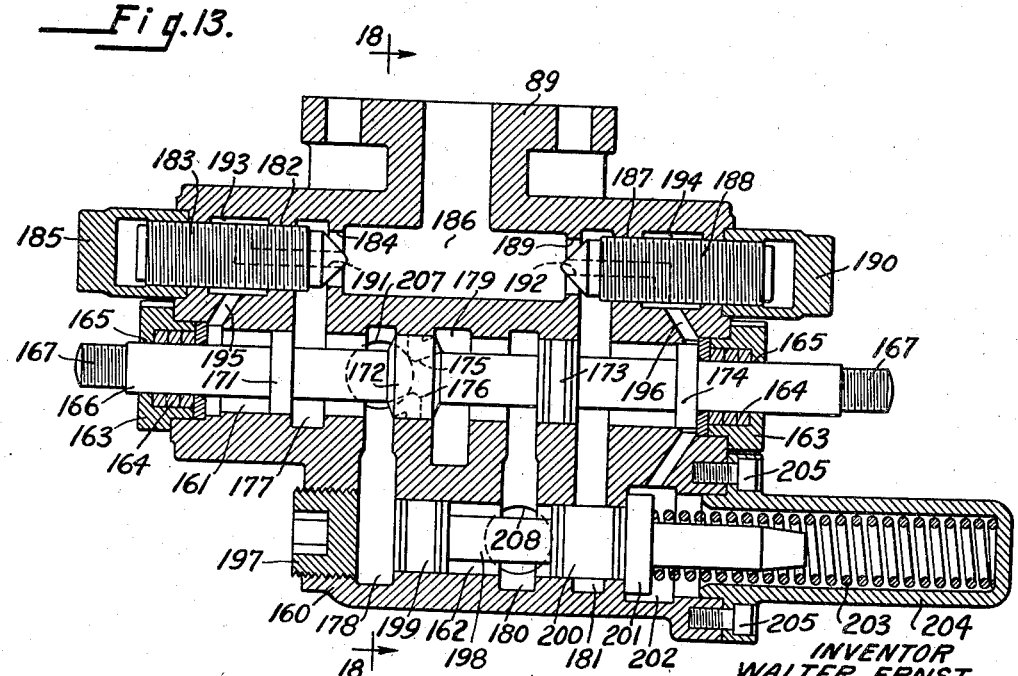
Figure 13 is a view similar to Figure 10, but with the valve in its fourth position, i. e., during the return stroke of the press.

While the pressure in the main cylinder is being released in this manner, the consequent drop in pressure permits the urge of the spring 203 to overcome the pressure remaining in the duct 178 and shift the valve rod 198 and its valve heads 199 and 200 to the fourth position of the valve, as shown in Figure 13, thus shutting off the by-passing arrangement of the pump. The pump now discharges from the port 206 of the valve 2 into the duct 179, through the annular passageway between the valve heads 172 and 173, and through the duct 180, into the port 208, thence through the connection 95 and pipe lines 86 and 41 to the pull-back cylinders 39. The pump now discharges into the pull-back cylinders 39 and starts the return stroke of the press.

When the press platen reaches the end of its return stroke the platen arm 54 (Figure 2) raises the collar 55 on the control rod 53, pushes the control rod 53 upward and actuates the linkages connected therewith to shift the valve rod 166 to its fifth position, shown in Figure 14. The valve heads 171, 172, 173 and 174 on the valve rod 166 now occupy an intermediate position to those shown in Figures 10 and 12, respectively. In this position the fluid from the pump entering the control valve 2 through the port 206 passes through the annular passageway to the right of the valve head 172, thence through the drilled passageways 175 in the valve head 172, thence into the duct 178, thence through the drilled passageways 176 in the valve head 172, and through the annular passageway to the left of the valve head 172, into the duct 177, thence outward through the choked passageway 184 into the discharge duct 186, and back to the surge tank 45 by way of the pipe line 90.

The fluid in the pull-back cylinders 39 is imprisoned in this position by the valve head 173 covering the entrance to the duct 180. The platen accordingly halts and remains in a fixed position while the control valve 2 is in its fifth position (Figure 14). Should there be any tendency for the platen to coast downward the valve rod 166 will shift to the right, thus opening up a connection between the port 206 from the pump 3 and the duct 180 leading to the port 208, so that pressure fluid flows along the line 86 and the pull-back cylinders, returning the platen to its previous position. By the same action the by-pass connection through the drilled passages 175 and 176 in the valve head 172 is closed. Consequently, the press platen is automatically returned to its top position whenever any tendency to trip downward is started.

*Electrical and hydraulic operation*

The detailed operation of the control valve 2 has been described immediately above. This control valve is operated by the valve operating rod 80 through the lever 77, the connecting rod 75, the arm 73 and the lever 65 (Figure 2). The latter may be operated either by the action of the hand lever 56 upon the control rod 53, or by the energization of the solenoid 71, according to the manner described below, or by spring 97.

The solenoid 71 and its electrical connections are shown in Figure 9. Power current is received from the lines 210 and 211 and passes to the magnetic switch 72. If the latter is closed the current from the lines 210 and 211 passes through the switch blades 212 and 213 into the lines 215 and 216, running to the solenoid 71. A third switch blade 214 of the magnetic switch 72 serves to close and open a holding circuit for the operating coil of the magnetic switch 72. Also included in the circuit shown in Figure 9 is the normally open forward switch 217, the normally closed reverse switch 218 and the selector switches 219 and 220. These switches are mounted upon the switch box 221, which in turn, is mounted upon the arm 222 (Figure 2) secured to the base member 10 of the press.

Control current to actuate the operating coil of the magnetic switch 72 is received from the lines 223 and 224 connected to the power lines 211 and 210 respectively, the line 223 being connected to the resistor 225. On the other side of the resistor 225 the line 226 runs to one side of the selector switch 219, from the opposite side of which the line 227 runs to one side of the operating coil of the magnetic switch 72. From the opposite side of the latter the line 228 runs to one side of the forward switch 217. A branch line 229 runs from the line 228 to one of the blade contacts engaged by the switch blade 214. From the opposite contact thereof the line 230 runs to one side of the switch 154, actuated by the pump control mechanism.

From the opposite side of this switch the line 231 runs to one side of the reverse switch 218, the opposite side of which is connected to the line 224, previously described. From the line 228 the branch line 232 runs to one side of the limit switch 62, the opposite side of which is connected to the selector switch 220 by the line 233. From the remaining terminal of the selector switch 220 the line 234 runs to the remaining terminal of the forward switch 217, whence the line 235 runs to a connection with the line 230.

The electrical circuit enables the press to be controlled in three different ways. Under completely automatic control the platen performs an indeterminate number of working and return strokes without halting at the end of each return stroke. In semi-automatic operation the platen performs a working stroke and a return stroke, halting at the end of the return stroke. Under manual operation the press is controlled by the operator as to the termination of either or both of its strokes.

For completely automatic operation the operator closes the selector switches 219 and 220. He then depresses the forward switch 217. These actions energize the operating coil of the magnetic switch 72 by current passing from the line 211, through the line 223, the resistor 225, the line 226, the selector switch 219, the line 227, the operating coil of the magnetic switch 72, the line 228, the forward switch 217, the line 235, the line 230, the pump operated switch 154, the line 231, the reverse switch 218 and the line 224 leading to the power line 210. The energization of the magnetic switch 72 causes its switch blades 212 and 213 as well as 214 to close, whereupon the operating coil thereof remains energized through the branch line 229, the switch blade 214 and the line 230, even when the operator releases the forward switch 217 to break the circuit between the lines 228 and 235.

As the magnetic switch 72 closes the solenoid 71 becomes energized by its lines 215 and 216 becoming connected to the power lines 210 and 211 through the switch blades 212 and 213. When this occurs the solenoid 71 (Figure 2) is drawn downward, moving the arm 73 to the right and the valve rod 166 to the left, into the position shown in Figure 10. The press platen then starts downward and performs its pressing operation, with the control valve 2 taking its second position as previously described in connection with Figure 11. Meanwhile, the main plunger 27 has coasted downwardly during the initial part of its stroke at a rapid traverse speed, withdrawing sufficient fluid through the surge valve 49 from the surge tank 45.

When the pressure within the hydraulic circuit builds up to a predetermined amount, as determined by the resistance of the work-piece to the pressing operation, the fluid pressure within the chamber 128 of the pump (Figure 5) forces the annular piston 129 downward and opens the normally closed switch 154. This breaks the holding circuit of the magnetic switch 72 by severing the connection between the lines 230 and 231. Accordingly, the blades 214, 212 and 213 disengage their contacts and the solenoid 71 becomes de-energized. The armature thereof is pulled upward under the influence of the spring 97 upon the linkage connected thereto.

The control valve 2 now occupies its third position (Figure 12) until the pressure has been released from the main cylinder 26 through the pipe line 87 and past the choked aperture 184 in the control valve 2, the pump discharge being automatically by-passed during this period, in the manner previously described.

The control valve now shifts to its fourth position (Figure 13), and the return movement of the platen takes place under the influence of the pressure fluid entering the pull-back cylinders 39. Meanwhile, the action of the surge valve, which is opened by the pressure fluid along the line 50 from the pull-back line 41, enables the fluid within the main cylinder 26 to be rapidly discharged into the surge tank 45.

When the platen 31 approaches the end of its return stroke the platen arm 54 will engage the collar 55 (Figure 2) and lift the control rod 53, causing the collar 61 thereon to engage and close the normally open limit switch 62. This reenergizes the operating coil of the magnetic switch 72 by current proceeding from the line 211, through the line 223, the resistor 225, the line 226, the selector switch 219, the line 227, the operating coil of the magnetic switch 72, the line 228, the branch line 232, the limit switch 62, the line 233, the selector switch 220, the lines 234, 235 and 230, the pump-operated switch 154, the line 231, the normally closed reverse switch 218 and the line 224 leading to the power line 210.

The second closing of the switch blades 212, 213 and 214 again energizes the solenoid 71 to start another pressing stroke and at the same time energizes the holding circuit of the magnetic switch 72 through the switch blade 214, in the manner previously described (Figure 9). The operating coil of the magnetic switch 72 thus remains energized through this holding circuit even when the limit switch 62 is opened by its release, because of the downward motion of the collar 61 upon the control rod 53, as permitted by the downward motion of the platen 31. The press will thereafter continue automatically to execute an indeterminate number of pressing and return strokes without halting and without the necessity, on the part of the operator, of depressing the forward switch 217 for each stroke.

To cause the press to operate under semi-automatic control, whereby the platen performs a working stroke, reverses itself and comes to rest at the end of a return stroke, the selector switch 220 is opened by the operator. The selector switch 219, however, is kept closed. The operator starts the operation of the forward stroke, as before, by closing the forward switch 217. The platen 31 will then execute a working stroke, in the manner previously described in connection with the completely automatic operation. As the selector switch 220 is open, however, the closing of the limit switch 62 at the end of the return stroke is ineffective to reenergize the operating coil of the magnetic switch 72. The solenoid 71 therefore remains unenergized and ineffective to start another working stroke. Accordingly, the platen 31 continues to move upward until the platen arm 54 engages the collar 55 and lifts the control rod 53, thereby shifting the control valve 2 to its fifth position, shown in Figure 14. By the action of the control valve 2 in its fifth position, as previously described, the platen 31 comes to rest at the top of its return stroke and is held in place by the action of the control valve in preventing the tripping of the platen, as described above.

When it is desired to cause the press to execute another semi-automatic cycle of operations, the operator again depresses the forward switch 217. The foregoing cycle of operations then repeats itself, and the platen moves downward, executes a pressing stroke, reverses and again comes to rest at the top of its return stroke, in the manner just described.

If it is desired to halt a working stroke at any intermediate point and to cause the return stroke to start, such as when the operator finds that the work is in an improper position or an accident has occurred, the operator depresses the normally closed reverse switch 218. As this switch 218 is in series with the normally closed pump-actuated switch 154, the opening of the reverse switch 218 has the same effect as the opening of the pump-actuated switch 154, and deenergizes the holding circuit of the operating coil of the magnetic switch 72 by breaking the connection between the line 231 and the line 224 leading to the power line 210.

The consequent opening of the magnetic switch blades 212 and 213 deenergizes the solenoid 71, whereupon the spring 97 shifts the control valve 2 to its third position or reversing position, as shown in Figure 12. Under completely automatic operation the closing of the limit switch 62 by the raising of the control rod 53 again energizes the solenoid 71 and causes the platen 31 to reverse at the top of its return stroke, thereby executing another pressing stroke. Under semi-automatic operation, however, the action of the platen arm 54 and collar 55 shifts the control rod 53 to cause the control valve 2 to shift to its fifth position (Figure 14), whereupon the platen comes to rest at the top of its return stroke, as described above. The reversal of the press by the use of the reverse switch 218, in effect, enables the operator to control the press platen manually by electrical means.

To render the electrical apparatus entirely ineffective, the selector switch 219 is opened. This opens the circuit between the line 226 running to the power line 211, through the resistor 225 and the line 223, and thus entirely prevents the energization of the operating coil of the magnetic switch 72 under any circumstances. The manual control lever 56 may then be employed to move the control rod 53 up or down and operate the control valve 2 through the linkages connecting the valve rod 166 with the control rod 53. In this manner the operator may control the action of the press by purely mechanical means, and cause it to execute pressing and return strokes of any desired length.

I desire to comprehend within my invention such modifications as may be embraced within my claims and the scope of my invention.

Having thus fully described my invention, what I claim as new and desire to secure by Letters Patent, is:—

1. In a hydraulic press circuit, a pressing cylinder, a pull-back cylinder, a pump connected to said cylinders having a discharge controlling member, a valve having a reversing valve member for selectively and reversibly directing the discharge from said pump to said cylinders and a pump by-pass valve member in communication therewith; said valve members being arranged in one position to direct the pump discharge into said pressing cylinder while releasing the fluid from said pull-back cylinder, in a second position to by-pass the discharge of said pump while releasing the pressure from said pressing cylinder, in a third position to direct the discharge of said pump into said pull-back cylinder, an electrical device for operating said reversing valve member, and a switch operated by the discharge controlling member of said pump for controlling the energization of said electrical device while releasing the fluid from said pressing cylinder.

2. In a hydraulic press circuit, a platen, a pressing cylinder and a pull-back cylinder connected thereto, a pump, means for selectively directing the discharge of said pump to said pressing cylinder for the execution of a pressing stroke, means for by-passing the discharge of said pump and for releasing the pressure from said pressing cylinder concomitantly, means for reducing the discharge of said pump upon the attainment of a predetermined pressure in said circuit, electrical means for operating said releasing means, and means responsive to the operation of said pump discharge reducing means for controlling said electrical means.

3. In a hydraulic press circuit, a platen, a pressing cylinder and a pull-back cylinder connected thereto, a pump, means for selectively directing the discharge of said pump to said pressing cylinder for the execution of a pressing stroke, means for by-passing the discharge of said pump and for releasing the pressure from said pressing cylinder concomitantly, pressure-responsive means for reducing the discharge of said pump upon the attainment of a predetermined pressure in said circuit, and electrical means for operating said releasing means, said electrical means including a switch operated by said pump discharge reducing means.

4. In a hydraulic press circuit, a platen, a pressing cylinder and a pull-back cylinder connected thereto, a pump, means for selectively directing the discharge of said pump to said pressing cylinder for the execution of a pressing stroke, means for by-passing the discharge of said pump and for releasing the pressure from said pressing cylinder concomitantly, pressure-responsive means for reducing the discharge of said pump upon the attainment of a predetermined pressure in said circuit, an electrical solenoid for operating said releasing means, and a switch for controlling the energization of said solenoid operated by said pump discharge reducing means.

5. In a hydraulic press circuit, a platen, a pressing cylinder and a pull-back cylinder connected thereto, a pump connected to said cylinders having a discharge controlling member, means for selectively directing the discharge of said pump to said pressing cylinder for the execution of a pressing stroke, a valve having a plurality of valve members arranged to by-pass the discharge of said pump, electrical devices for operating said valve members, and a switch operated by the discharge controlling member of said pump for controlling the energization of said electrical devices.

6. In a hydraulic press circuit, a platen, a pressing cylinder and a pull-back cylinder connected thereto, a pump connected to said cylinders having a discharge controlling member, a valve having a plurality of valve members for selectively directing the discharge from said pump to said cylinders; said valve members being arranged in one position to direct the pump discharge into said pressing cylinder while releasing the pressure from said pull-back cylinder, in a second position to by-pass the discharge of said pump while releasing the pressure from said pressing cylinder, and in a third position to direct the discharge of said pump into said pull-back cylinder while releasing the pressure from said pressing cylinder, electrical devices for operating one of said valve members, and a switch operated by the discharge controlling member of said pump for controlling the energization of said electrical devices.

7. In a hydraulic press circuit, a press having a platen and hydraulic motor means for operating said platen in a forward direction and in a reverse direction, a variable delivery pump having a flow-controlling member adapted to vary the discharge of said pump, pressure-responsive devices for shifting said flow-controlling member upon the attainment of a predetermined pressure in said circuit, switch means operated by said flow-controlling member, valve means for directing the discharge of said pump to said motor means, and means including electrical devices for operating said valve means, said switch means being arranged to control the energization of said electrical devices.

8. In a hydraulic press circuit, a press having a platen and hydraulic motor means for operating said platen in a forward direction and in a reverse direction, a pump for supplying pressure fluid to said motor means, a valve having a pair of valve members, one of said valve members being arranged to control the direction of the supply of pressure fluid to said motor means and the other valve member being arranged responsive to the exceeding of a predetermined pressure in the forwardly directing portion of said hydraulic motor means to by-pass the discharge of said pump during the release of pressure fluid from said motor means prior to the reversal thereof, and means for impeding the flow of pressure fluid from said motor means during said release.

9. In a hydraulic press circuit, a press having a platen, and hydraulic motor means for operating said platen in a forward direction and in a reverse direction, a variable delivery pump having a flow-controlling member adapted to vary the discharge of said pump, means for reversibly directing the discharge of said pump to said motor means, means including electrical devices for operating said directing means, and a circuit controlling device arranged to control the energization of said electrical operating devices connected to said flow-controlling member for actuation thereby.

10. In a hydraulic press circuit, a press having a platen and hydraulic motor means for operating said platen in a forward direction and in a reverse direction, a variable delivery pump having a flow-controlling member adapted to vary the discharge of said pump, pressure-responsive means associated with said pump for shifting said flow-controlling member to reduce the discharge of said pump upon the attainment of a predetermined pressure, means for reversibly directing the discharge of said pump to said motor means, means including electrical devices for operating said directing means, and a circuit controlling device arranged to control the energization of said electrical operating devices connected to said flow-controlling member for actuation thereby.

11. In a hydraulic press circuit, a press having a platen and a hydraulic motor means for operating said platen in a forward stroke and in a return stroke, a variable delivery pump having a movable flow-controlling member for supplying pressure fluid to said motor means, valve means for controlling the supply of pressure fluid to said motor means for its forward and return strokes, means including an electrical device for shifting said valve means, an electrical circuit arranged to operate said valve means to cause said platen to substantially uninterruptedly perform an indeterminate number of forward and return strokes, and an electrical circuit controller electrically connected to said electrical circuit to control the same and operatively connected to said pump flow-controlling member to be operated thereby.

12. In a hydraulic press circuit, a press having a platen and hydraulic motor means for operating said platen in a forward stroke and in a return stroke, a variable delivery pump having a movable flow-controlling member for supplying pressure fluid to said motor means, valve means for controlling the supply of pressure fluid to said motor means for its forward and return strokes, means including an electrical device for shifting said valve means, an electrical circuit arranged to operate said valve means to cause said platen to substantially uninterruptedly perform an indeterminate number of forward and return strokes, means associated with said pump to shift said flow-controlling member to reduce the discharge of said pump upon the attainment of a predetermined pressure, and an electrical circuit controller electrically connected to said electrical circuit to control the same and operatively connected to said pump flow-controlling member to be operated thereby upon the attainment of said predetermined pressure.

13. In a hydraulic press circuit, a press having a platen and hydraulic motor means for operating said platen in a forward stroke and in a return stroke, a variable delivery pump having a movable flow-controlling member for supplying pressure fluid to said motor means, valve means for controlling the supply of pressure fluid to said motor means for its forward and return strokes, means including an electrical device for shifting said valve means, an electrical circuit arranged to operate said valve means to cause said platen to perform a single forward stroke and a single return stroke with a halt at the end thereof, and an electrical circuit controller electrically connected to said electrical circuit to control the same and operatively connected to said pump flow-controlling member to be operated thereby.

14. In a hydraulic press circuit, a press having a platen and hydraulic motor means for operating said platen in a forward stroke and in a return stroke, a variable delivery pump having a movable flow-controlling member for supplying pressure fluid to said motor means, valve means for controlling the supply of pressure fluid to said motor means for its forward and return strokes, means including an electrical device for shifting said valve means, an electrical circuit arranged to operate said valve means to cause said platen to perform selectively a continuously repeated indeterminate number of forward and return strokes, or a single forward stroke and a single return stroke with a halt at the end thereof, and an electrical circuit controller electrically connected to said electrical circuit to control the same and operatively connected to said pump flow-controlling member to be operated thereby.

15. In a hydraulic press system, a pressing cylinder, a pull back cylinder, a pump, a valve casing having a plurality of ports, a hydraulic circuit interconnecting said cylinders with said pump and said valve casing, a valve member arranged to distribute fluid selectively to a plurality of ports in said casing, said valve member being arranged in one position to relieve the pressure in said pressing cylinder through certain of said ports, a by-pass member arranged to shift into a pump delivery by-passing position relatively to said ports in response to the attainment of a predetermined pressure in said pressing cylinder to by-pass a portion of the fluid entering said casing while said valve member relieves the pressure in said pressing cylinder, and means for adjustably regulating the rate of pressure relief from said pressing cylinder during the period in which said by-pass member becomes operative, said pump being connected through said ports in one position of said valve members to supply fluid to said pressing cylinder while relieving pressure in said pull-back cylinder and in another position to supply fluid to said pull-back cylinder while relieving pressure in said pressing cylinder.

WALTER ERNST.